United States Patent
Luo et al.

(10) Patent No.: US 10,339,974 B1
(45) Date of Patent: Jul. 2, 2019

(54) AUDIO CONTROLLER DEVICE AND METHOD OF OPERATION THEREOF

(71) Applicant: MOTOROLA SOLUTIONS, INC, Chicago, IL (US)

(72) Inventors: Yang Luo, Chicago, IL (US); Kang Bum Lee, Des Plaines, IL (US); Gelayol Moradzadeh, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/908,943

(22) Filed: Mar. 1, 2018

(51) Int. Cl.
  *G06F 17/00* (2019.01)
  *G11B 27/031* (2006.01)
  *G11B 27/00* (2006.01)
  *G11B 20/10* (2006.01)

(52) U.S. Cl.
  CPC ............ *G11B 27/031* (2013.01); *G11B 20/10* (2013.01); *G11B 27/005* (2013.01)

(58) Field of Classification Search
  CPC .................................................. G11B 27/031
  USPC ................. 700/94; 379/88.23; 386/206, 224; 707/770; 382/228
  See application file for complete search history.

(56) References Cited

U.S. PATENT DOCUMENTS

| | | | | |
|---|---|---|---|---|
| 5,583,652 A | * | 12/1996 | Ware | G10H 1/0033 386/206 |
| 8,654,939 B2 | * | 2/2014 | Kovales | H04M 3/533 379/88.23 |
| 9,666,208 B1 | * | 5/2017 | Rubin | G06F 17/21 |
| 9,741,392 B2 | | 8/2017 | Ngiam et al. | |
| 2004/0120582 A1 | * | 6/2004 | Sarkar | G06K 9/62 382/228 |
| 2004/0267952 A1 | | 12/2004 | He et al. | |
| 2005/0207733 A1 | | 9/2005 | Gargi | |
| 2007/0223873 A1 | | 9/2007 | Gilbert et al. | |
| 2008/0229235 A1 | | 9/2008 | Vau et al. | |
| 2013/0022330 A1 | * | 1/2013 | Carter | H04N 21/41407 386/224 |
| 2016/0154880 A1 | * | 6/2016 | Hoarty | G06F 16/70 707/770 |
| 2018/0144040 A1 | * | 5/2018 | Vlack | G10L 25/54 |

* cited by examiner

*Primary Examiner* — Md S Elahee
(74) *Attorney, Agent, or Firm* — Raguraman Kumaresan

(57) ABSTRACT

An audio controller device and method of operation thereof. The audio controller device includes a memory for storing audio data and a plurality of primary audio control interfaces. An electronic processor at the audio controller device is configured to identify a plurality of audio segments from the audio data based on a plurality of contextual parameters associated with the audio data, associate each of the plurality of audio segments to a respective one of the primary audio control interfaces, and control a playback operation associated with the respective one of the audio segments when an input is received at one or more of the primary audio control interfaces. The electronic processor controls the playback operation by varying a playback speed rate associated with the respective one of the audio segments when the input is received at one or more of the primary audio control interfaces.

20 Claims, 5 Drawing Sheets

US 10,339,974 B1

AUDIO CONTROLLER DEVICE AND METHOD OF OPERATION THEREOF

BACKGROUND OF THE INVENTION

Public safety departments record and store large quantity of audio files for investigation and record purposes. The audio files are accessed by users such as investigating officers, to discover evidence and/or find information that may be useful for their investigations. However, users accessing such audio files often have varying interest levels in the subject matter of the audio content. So, not all users may be interested to listen to the entirety of a conversation in the audio file. Also, some users may find it difficult to understand some portions of the audio content and therefore may need to playback these portions at a relatively slower speed for better understanding of the content. Accordingly, conventional user interface controls that are available for controlling the playback operation of an audio file are not suitable in such cases.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
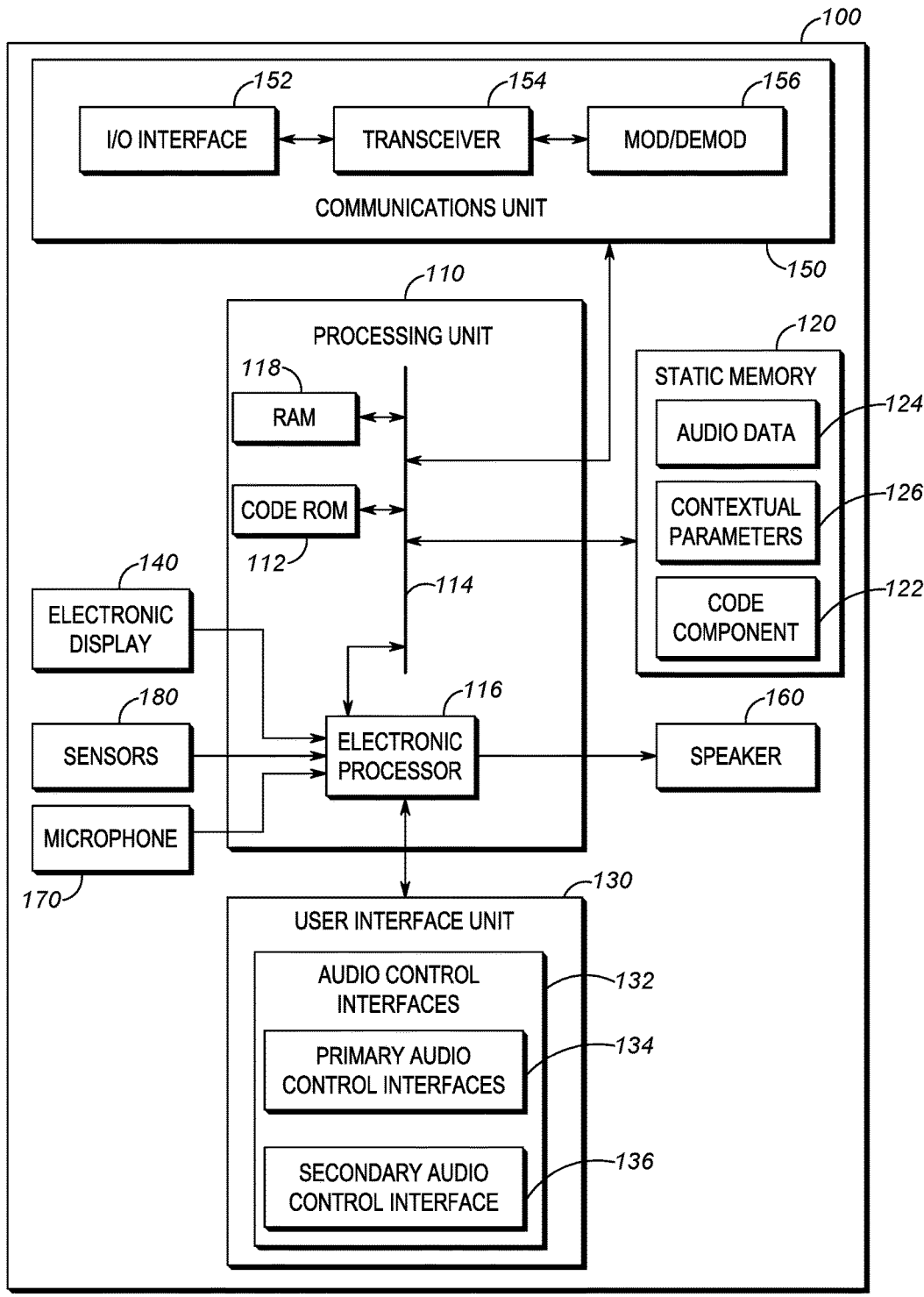
FIG. 1 is a block diagram of an audio controller device, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In conventional systems, when user adjusts playback speed rate of an audio stream, the playback speed rate adjustment is applied regularly to the entire audio stream. For example, when the user increases the playback speed rate from 1× to 3×, the playback speed rate of 3× is applied to the remaining playback portion of the audio stream unless the user manually adjusts the playback speed rate again during playback of the audio stream. Similarly, when the user decreases the playback speed rate from 1× to 0.5×, the playback speed rate of 0.5× is applied to the remaining playback portion of the audio stream unless the user manually adjusts the playback speed rate again. However, applying the same playback speed rate to the entire portion of the audio file may result in difficulty in comprehending certain portions of the audio stream for which audio output may be difficult to understand for various reasons. For example, such difficulty in comprehending a speech content associated with an audio stream may arise from factors such as speaker's tone, language, speaking behavior, volume, along with factors external to the audio content itself, such as audio quality, background noise, location of the speaker, speaker's health and activity, and the like. Disclosed is an improved device and process for controlling playback operation associated with an audio content.

One exemplary embodiment provides an audio controller device. The audio controller device includes a memory for storing audio data and a plurality of primary audio control interfaces. An electronic processor at the audio controller device is configured to identify a plurality of audio segments from the audio data based on a plurality of contextual parameters associated with the audio data, associate each of the plurality of audio segments to one of the primary audio control interfaces, and control a playback operation associated with respective one of the audio segments when an input is received at each of the primary audio control interfaces. The electronic processor may control the playback operation by varying a playback speed rate associated with respective one of the audio segments when the input is received at one or more of the primary audio control interfaces.

Another exemplary embodiment provides a method of operating an audio controller device. The method includes: storing, at a memory of the device, an audio data; identifying, by an electronic processor of the device, a plurality of audio segments from the audio data based on a plurality of contextual parameters associated with the audio data; associating, by the electronic processor, each of the plurality of audio segments to one of a plurality of primary audio control interfaces provided at the audio controller device; and controlling, by the electronic processor, a playback operation associated with respective one of the audio segments when an input is received at one or more of the primary audio control interfaces.

A further exemplary embodiment provides an audio controller device a memory for storing audio data; an electronic display; and an electronic processor coupled to the memory and the electronic display. The electronic processor is configured to: identify a plurality of audio segments from the audio data based on a plurality of contextual parameters associated with the audio data; generate a plurality of graphical user interface components; associate each of the plurality of graphical user interface components to one of the plurality of audio segments; render, via the electronic display, the plurality of graphical user interface components; and adjust a playback operation parameter associated with respective one of the audio segments according to an input received at one or more of the plurality of graphical user interface components.

Each of the above-mentioned embodiments will be discussed in more detail below, starting with an example audio controller device in which the embodiments may be practiced, followed by an illustration of processing steps for achieving the method of operating the audio controller device. Further advantages and features consistent with this disclosure will be set forth in the following detailed description, with reference to the figures.

Referring now to drawings and in particular to FIG. 1, a block diagram of an example audio controller device 100 is shown. In accordance with embodiments, the audio controller device 100 is an electronic device including a processing unit 110, a static memory 120, a user interface unit 130, an electronic display 140, a communications unit 150, a speaker 160, a microphone 170, and one or more sensors 180. The audio controller device 100 is presented as an example that may be programmed and configured to carry out the functions described herein, for example, controlling playback operations for an audio data. While FIG. 1 represents an audio controller device 100 having an electronic display 140, a communications unit 150, a speaker 160, a microphone 170, and one or more sensors 180, in some embodiments, depending on the type of the audio controller device 100, the audio controller device 100 may include fewer or additional components in configurations different from that illustrated in FIG. 1. For example, when the audio controller device 100 is implemented as a standalone media player, the audio controller device 100 may not include a communications unit 150. As another example, one or more functionalities of the audio controller device 100 that is implemented at a communication device such as a portable radio, mobile phone, and the like includes the communications unit 150 that is configured to receive audio data from other communication devices. In other embodiments, the components associated with the audio controller device 100 are implemented in a distributed manner in multiple electronic devices that interface and/or communicate with each other to perform the functions described herein. Other combinations are possible as well.

The processing unit 110 includes a code Read Only Memory (ROM) 112 coupled to a common data and address bus 114 for storing data for initializing system components. The use of control and data buses 114 for the interconnection between and exchange of information among the various modules and components would be apparent to a person skilled in the art in view of the description provided herein. The processing unit 110 further includes an electronic processor 116 coupled by the common data and address bus 114, to a Random Access Memory (RAM) 118 and the static memory 120. The electronic processor 116 may include hardware ports for coupling to different components of the audio controller device 100. The electronic processor 116 includes one or more logic circuits, one or more processors, one or more microprocessors, one or more ASIC (application-specific integrated circuits) and one or more FPGA (field-programmable gate arrays), and/or another electronic device. In some embodiments, the electronic processor 116 is not a generic controller and/or a generic device, but a device specifically configured to implement a functionality for controlling playback operation of an audio data, for example, audio data 124 stored in the static memory 120. In some embodiments, the electronic processor 116 specifically comprises a computer executable engine configured to implement specific functionality for controlling playback operation of the audio data.

The static memory 120 may store operating code 122 for the electronic processor 116 that, when executed, performs one or more of the operations set forth in the accompanying figures and text. The static memory 120 may comprise non-transitory computer-readable media components, for example hard-disk drive (HDD), an optical disk drive such as a compact disk (CD) drive or digital versatile disk (DVD) drive, a solid state drive (SSD), a tape drive, a flash memory drive, or a tape drive, and the like.

The static memory 120 is further configured to store audio data 124 for which the playback operation is controlled in accordance with some embodiments. The audio data 124 may be stored as one or more audio files or received as audio streams, each corresponding to audio content that has been captured/recorded either at the audio controller device 100 or received/streamed from a remote media capturing device via the communications unit 150. In accordance with some embodiments, the audio data 124 corresponds to audible portions of transmissions that are recorded during a call between two or more parties. For example, the audio data 124 correspond to voice conversations transmitted during a talk group call between two or more users. The talk group call may be a push-to-talk (PTT) call that is implemented using full-duplex or half-duplex communication standards. As another example, the audio data 124 corresponds to voice conversations that are recorded during an emergency call, for example, conversations between a user and an operator. In other embodiments, the audio data 124 represents audio portion of video data that is obtained for example, from video surveillance devices. In further embodiments, the audio data 124 may correspond to sound data captured by ambient listening devices that are deployed in one or more predetermined locations. In public safety systems, such audio data 124 obtained from one or more audio sources may be stored, for example, in a computer aided dispatch (CAD) center, a record management system (RMS), cloud storage systems, and the like, and made accessible to authorized public safety personnel, for example, via the audio controller device 100, to listen to the audio data 124 for investigation of public safety incidents.

The static memory 120 may be further configured to store contextual parameters 126 that are associated with the audio data 124. The contextual parameters 126 include, but are not limited to speech portion/silent portion in the audio data 124, volume level associated with different portions of the audio data 124, language/tone/accent/length of speech/rate of speech of different portions of the audio data 124, noise level/background noise associated with different portions of audio data 124, video data corresponding to different portions of the audio data 124, user profile identifying a speaker corresponding to the speech content associated with different portions of the audio data 124, and user profile identifying a listener of the audio data 124. The user profile identifying the speaker may further include parameters that define the status of the speaker during a time period of capturing the audio data 124. For example, the status may include: user status (e.g., user health status) and user role (e.g., a police officer or a fire fighter) corresponding to the speaker; geographic profile of the speaker, for example, location at which the audio data 124 is captured, temperature corresponding to the location at which the audio data 124 is captured, direction of the speaker, and the like; device/equipment status associated with the speaker, for example, state information regarding a weapon used by the speaker during a time period at which the audio data 124 was captured corresponding to that speaker; and source of the audio data 124, for example, information related to device type and configuration settings of a device which recorded and/or captured the audio data 124. Other contextual parameters defining the audio data 124 can be stored as well.

In accordance with some embodiments, the contextual parameters 126 are used to identify different segments of the audio data 124. Each audio segment is identified based on whether a combination of one or more contextual parameters uniquely defines and/or has an effect on the content of that particular audio segment. As used herein, the term 'audio segment' represents a group of contiguous and/or non-contiguous frames of a given audio data, where each group of frames that forms the audio segment is associated by a unique combination of one or more contextual parameters. For example, a first audio segment defined by a first group of frames within the audio data 124 includes speech content of a first user and a second audio segment defined by a second group of frames within the audio data 124 includes speech content of a second user.

Figure 3:
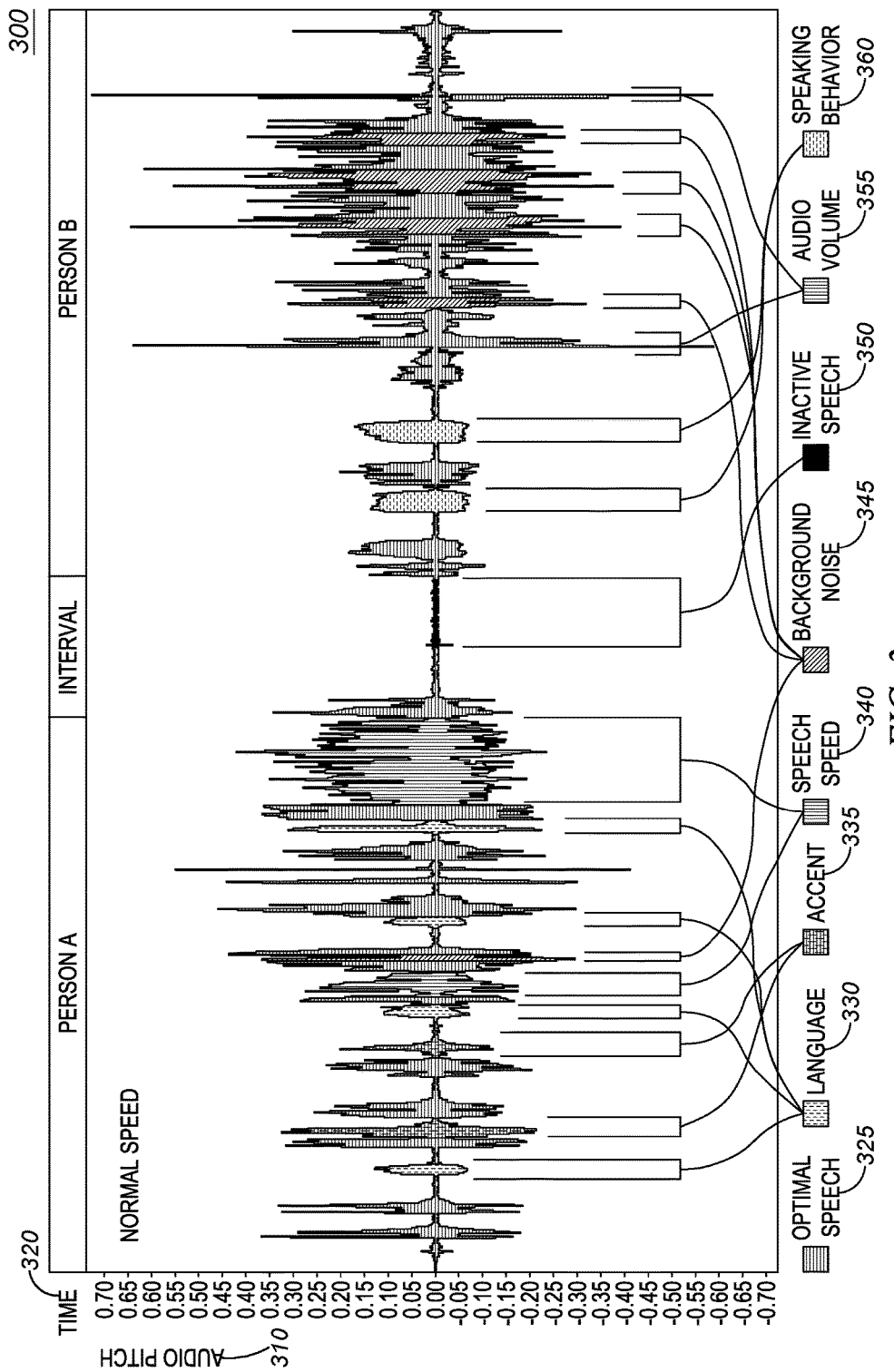
FIG. 3 is a graph illustrating different audio segments that are identified from an audio data based on contextual parameters associated with the audio data, in accordance with some embodiments.
Figure 4:
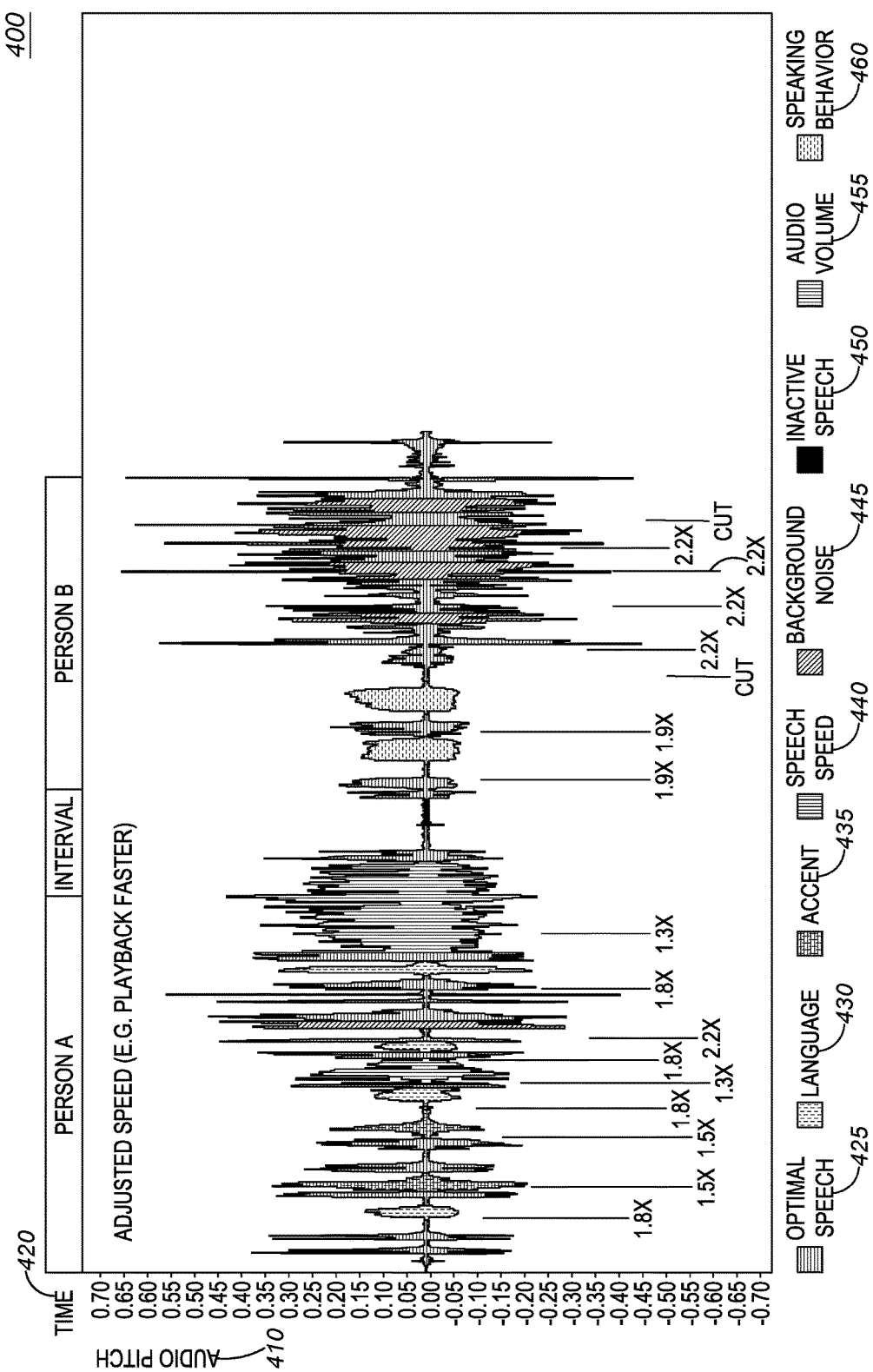
FIG. 4 is a graph illustrating optimal playback speed rates that are determined for different audio segments based on contextual parameters associated with the audio data, in accordance with some embodiments.

In accordance with some embodiments, the audio controller device 100 determines contextual parameters associated with an audio data 124 by processing content of the audio data 124. The audio controller device 100 may analyze a sound graph (as shown in FIGS. 3 and 4) that is generated corresponding to the audio data 124 to identify, for example, based on the pitch of the sound, a first audio segment that has speech content and a second audio content that does not include any speech content. As an example, the audio controller device 100 may employ a speech-to-text analyzer to identify a first audio segment that has speech content with a first language and a second audio segment that has speech content with a second language. As a further example, the audio controller device 100 may also employ voice recognition algorithms to identify a first audio segment that has speech content of a first speaker and a second audio segment that has speech content of a second speaker.

In accordance with some embodiments, the audio controller device 100 may determine contextual parameters associated with the audio data 124 further based on data that is acquired independently and/or separately from the content of the audio data 124. For example, a surveillance camera deployed in proximity to a device which captured the audio data 124, may have captured an image identifying the face of the speaker at a time period at which a particular audio segment of the audio data 124 corresponding to the speaker was captured. In this example, the audio controller device 100 may receive the image identifying the face of the speaker in addition to the audio data itself. The audio controller device 100 may process the received image (e.g., via face recognition algorithms) to identify the identity of the speaker from the image and may further determine that a particular audio segment of the audio data 124 corresponds to the identified speaker. In accordance with some embodiments, the audio controller device 100 receives sensor data from one or more sensor devices that may be deployed in relation to an audio capturing device (e.g., microphone) where the audio data 124 is captured. The audio controller device 100 may obtain information related to the environment (e.g., location, temperature, user status, and the like) at which the audio data 124 was captured from one or more sensor devices such as a location sensor (e.g., global positioning system (GPS) receiver), temperature sensor, camera/video surveillance devices, microphone, biometric sensor, health sensor, holster sensor (e.g., configured to determine whether a weapon is drawn), motion sensor, vibration sensor, and the like. The sensor data as described herein may include, but is not limited to, sensor metadata such as a GPS location and/or time stamp of an image, an audio, a video, and the like. The audio controller device 100 may use such sensor data to differentiate different groups of frames within the audio data 124. For example, the audio controller device 100 may identify that a first audio segment includes speech content that is captured corresponding to a speaker who was positioned at a first location and a second audio segment includes speech content that is captured corresponding to a speaker who was positioned at a second location. As another example, the audio controller device 100 may identify that a first audio segment within the audio data 124 corresponds to a time period at which a weapon was removed from a sensor enabled holster and a second audio segment corresponds to a time period at which the weapon was discharged, for example, which is deduced from video data. The contextual parameters may also be obtained directly from metadata that is stored corresponding to the audio data 124 in systems such as the CAD center, RMS, and other databases.

In accordance with some embodiments, the audio controller device 100 may also determine contextual parameters associated with the audio data 124 further based on input from machine learning algorithms. For example, machine learning algorithms implemented at the audio controller device 100 or at a remote device may perform machine learning to identify the contextual parameters based on logged behavioral information about one or more speakers corresponding to the audio data 124 or a listener of the audio data 124. For example, the machine learning algorithm may identify from a given user profile that the potential listener of the audio data 124 does not speak a first language, while the audio content includes portions that are associated with the first language. In this case, the machine learning algorithm may automatically determine the contextual parameter as the 'language' of the speech content and may further identify an audio segment that contains or does not contain speech content corresponding to the first language. Alternatively, the contextual parameters may be manually defined based on user preferences. For example, a listener of the audio data 124 may input parameters such as accent, a particular language, and a weapon discharge event as the contextual parameters, and in response, the audio controller device 100 identifies different audio segments based on the user defined parameters.

The user interface unit 130 operates to receive input from, for example, a user of the audio controller device 100, to provide system output, or a combination of both. The user interface unit 130 obtains information and signals from, and provides information and signals to, devices both internal and external to the audio controller device 100 (for example, over one or more wired and/or wireless connections). Input may be provided via different hardware and software elements, for example, a keypad, mouse, microphone, soft keys, icons, or soft buttons on the electronic display 140, a scroll ball, physical buttons, control knobs and the like.

In accordance with some embodiments, the user interface unit 130 includes a plurality of audio control interfaces 132 that are configured to adjust one or more playback operation parameters associated with the playback operation of the audio data 124. The audio control interfaces 132 include a plurality of primary audio control interfaces 134 and a secondary audio control interface 136. In accordance with some embodiments, the audio controller device 100 associates each of the plurality of audio segments (that are identified based on different combination of one or more contextual parameters) to one of the plurality of primary audio control interfaces 134, so that one or more playback operation parameters for each audio segment can be independently and/or separately controlled by the associated primary audio control interface 134. In accordance with some embodiments, the playback operation parameters for each audio segment include varying a playback speed rate of the respective audio segments, skipping a playback operation of the respective audio segments, and varying a speaker volume level associated with the respective audio segments. For example, an input received at a particular one of the primary audio control interfaces 134 causes the electronic processor 116 of the audio controller device 100 to only vary the playback speed rate of the associated audio segment while the playback speed rate of other portions i.e., other audio segments of the audio data 124 remain at a user selected value or system defined value. In accordance with embodiments, the electronic processor 116 automatically applies the playback speed rate to a playback duration (between a start frame and an end frame) of the corresponding audio segment. Further the playback speed rate is automatically adjusted for the next audio segment within the audio file in accordance with the playback speed rate that is set for the next audio segment using the respective primary audio control interface 134

This association of different primary audio control interfaces 134 to different audio segments allows the user to selectively control the playback speed rate for an audio segment based on contextual parameters. This also eliminates the need for the user to expressly select a starting frame and/or end frame each time the user wants to vary a playback speed rate or skip playback operation or change speaker volume level for a particular portion of the audio data 124.

In accordance with some embodiments, the secondary audio control interface 136 is configured to scale the playback speed rates (or other playback operation parameters) that are set at each one of the primary audio control interfaces 134 when an input is received at the secondary audio control interface 136. The scaling factor for scaling the playback speed rate is determined based on a level of input received at the secondary audio control interface 136. In some embodiments, the audio controller device 100 may not provide a secondary audio control interface 136.

In accordance with some embodiments, the primary audio control interfaces 134 and secondary audio control interface 136 are implemented as physical hardware interfaces (for example, physical buttons or knobs) that are disposed on a housing of the audio controller device 100. In some embodiments, the number of audio segments that are identified from the audio data 124 may not be more than the number of physical hardware interfaces that are available at the audio controller device 100. This ensures that each of the identified audio segments is associated to one of the available physical hardware interface for independently controlling playback operation parameters of the respective audio segments.

In some embodiments, the primary audio control interfaces 134 and secondary audio control interface 136 are implemented as graphical user interface (GUI) components that are automatically generated (for example, by the electronic processor 116 of the audio controller device 100) based on the audio data 124 and further rendered via the electronic display 140 of the audio controller device 100. The electronic display 140 is a suitable display such as, for example, a liquid crystal display (LCD), or an organic light-emitting diode display (OLED) touch screen. In accordance with some embodiments, the primary audio control interfaces 134 and secondary audio control interface 136 may be presented as graphical user interface components within a touch screen display area of the electronic display 140 to allow the user to provide touch input at a particular audio control interface to control the playback operation parameter of the corresponding audio segment. In some embodiments, the electronic display 140 may also present a list of audio data 124 (e.g., list of audio files) to allow the user to select a particular audio data for which the embodiments of the functions described herein need to be implemented. For example, when a user selects a particular audio data from the list, the audio controller device 100 automatically identifies a plurality of audio segments from the audio data based on a plurality of contextual parameters associated with the audio data and associates each of the plurality of audio segments to one of the plurality of primary audio control interfaces 134. When the audio segments are associated to the primary audio control interfaces 134, the playback operation parameter such as playback speed rate of different audio segments can be controlled by the user by providing input at the respective primary audio control interfaces 134.

The communications unit 150 may include one or more wired and/or wireless input/output (I/O) interfaces 152 that are configurable to enable the audio controller device 100 to communicate with other devices, such as a portable radio, a laptop, a wireless radio access network, a mobile communication device, cloud storage devices, CAD and RMS systems, and the like. In accordance with some embodiments, the audio controller device 100 may obtain the audio data 124 from other devices or systems via the communications unit 150. The communications unit 150 may include one or more wireless transceivers 154 used for infrastructure radio access network (RAN) or direct-mode media (e.g., voice, audio, video, etc.) that has a transmitter transmit range on the order of miles, e.g., 0.5-50 miles, or 3-20 miles (i.e., long-range in comparison to a short-range transmitter such as a Bluetooth™, Zigbee™, or NFC (near field communication) transmitter) with other communication devices and/or an infrastructure RAN (e.g. a wireless communications tower, a cellphone tower, and the like). One or more wireless transceivers 154 may include a long-range transmitter which may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long-range transmitter may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over internet protocol (VoIP), an LTE Direct or LTE Device to Device, or a PTT over IP (PoIP) application may be implemented. In still further embodiments, the long-range transmitter may implement a Wi-Fi protocol, for example in accordance with an IEEE 802.11 standard (e.g., 802.11a, 802.11b, 802.11g) or a WiMAX (Worldwide Interoperability for Microwave Access) protocol, for example operating in accordance with an IEEE 802.16 standard.

The communications unit 150 may additionally or alternatively include one or more wireline transceivers 154, such as an Ethernet transceiver, a universal serial bus (USB) transceiver, or similar transceiver configurable to communicate via a twisted pair wire, a coaxial cable, a fiber-optic link, or a similar physical connection to a wireline network. The transceiver 808 is also coupled to a combined modulator/demodulator 156.

The audio controller device 100 further includes a speaker 160 for reproducing audio that is decoded from the audio data 124 during playback of the audio data 124, and/or voice or audio streams of calls received via the communications unit 150 from other communication devices, from other ad-hoc or direct mode devices, and/or from an infrastructure radio access network (RAN) device, or may playback alert tones or other types of pre-recorded audio.

The microphone 170 may be present for capturing audio from a user and/or other environmental or background audio that is further processed by the processing unit 110 in accordance with the remainder of this disclosure and/or is stored/transmitted as voice or audio stream data (e.g., audio data 124), or as acoustical environment indications, by the communications unit 150 to other devices and systems.

In accordance with some embodiments, the audio controller device 100 may further include one or more sensors 180. For example, when the audio data 124 is captured at the audio controller device 100 via the microphone 170, the audio controller device 100 identifies contextual parameters 126 based on sensor data obtained from one or sensors 180. The sensors 180 may include, but are not limited to one or more of: an imaging device, a microphone, a camera, a body worn camera, a video device, smart glasses, a camera-status sensor, a biometric sensor, a biometric sensor wristband, a health sensor, a bio-monitoring sensor, an environmental sensor, a user-status sensor, a holster sensor (e.g. configured to determine whether a weapon is drawn), a "man-down" sensor (e.g. such as a sensor-equipped vest, and the like and/or an accelerometer and the like), a location sensor (including, but not limited to, a global positioning system (GPS) receiver), a vehicle sensor and the like. Hence, sensor data as described herein may include, but is not limited to, sensor metadata such as a GPS location and/or time stamp of an audio, an image, a video, and the like.

Figure 2:
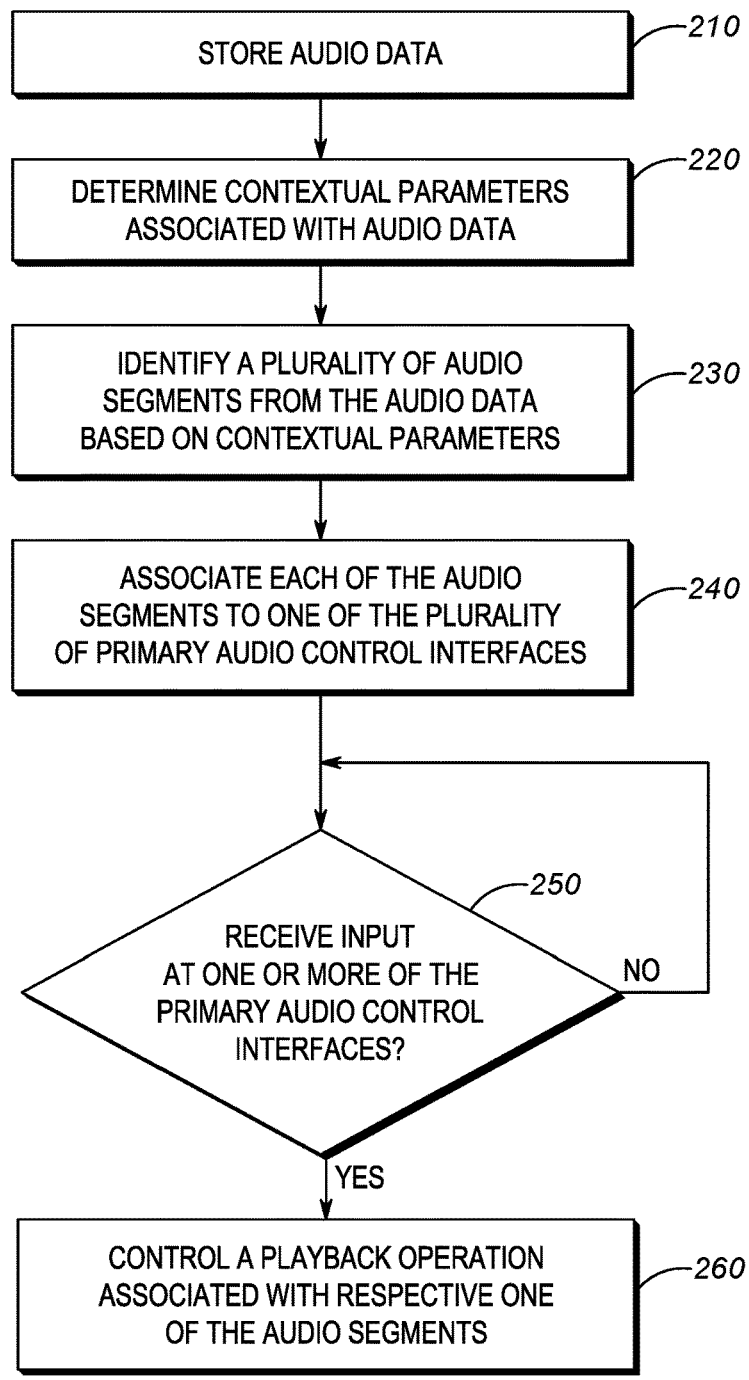
FIG. 2 is a flowchart of a method of operating the audio controller device of FIG. 1, in accordance with some embodiments.

FIG. 2 illustrates a flow chart diagram of a method 200 of operating an audio controller device to control playback operation associated with an audio data. While a particular order of processing steps is indicated in FIG. 2 as an example, timing and ordering of such steps may vary where appropriate without negating the purpose and advantages of the examples set forth in detail throughout the remainder of this disclosure. As an example, the method is performed by the electronic processor 116 of the audio controller device 100. Other embodiments of the method 200 may be performed on multiple processors within the same device or on multiple devices.

At block 210, the audio controller device 100 stores audio data 124. The audio data 124 may correspond to voice or audio streams of calls received via the communications unit 150 from other devices, digital audio data captured locally and stored at the audio controller device 100, from other ad-hoc or direct mode devices, and/or from an infrastructure RAN device, or other types of pre-recorded audio.

At block 220, the audio controller device 100 determines contextual parameters 126 associated with the stored audio data 124. In accordance with some embodiments, the audio controller device 100 determines contextual parameters associated with the audio data 124 by one or more of: processing the content of the audio data 124; processing data that is acquired independently from the content of the audio data 124 itself, for example, based on sensor data that is acquired from the sensors and/or metadata received from CAD or RMS systems; processing data received from machine learning algorithms; and processing input identifying user preferences. For example, the audio controller device 100 determines that the stored audio data 124 is defined by a plurality of contextual parameters. The contextual parameters associated with the audio data 124 may be determined based on one or more of: speech portion/silent portion in the audio data 124, volume level associated with different portions of the audio data 124, language/tone/accent/length of speech/rate of speech of different portions of the audio data 124, noise level/background noise associated with different portions of audio data 124, video data corresponding to different portions of the audio data 124, user profile identifying a speaker corresponding to the speech content associated with different portions of the audio data 124, and user profile identifying a potential listener of the audio data 124.

At block 230, the audio controller device 100 identifies a plurality of audio segments from the audio data 124 based on the plurality of contextual parameters associated with the audio data 124. For example, in a given sequence of audio frames numbered from F1 through F80 within the audio data 124, the audio controller device 100 may identify a first set of frames {F1-F40} as being associated with a first contextual parameter (or a combination of one or more contextual parameters) and a second set of frames {F41-F80} as being associated with a second contextual parameter (or a combination of one or more contextual parameters). In this example, the first contextual parameter may indicate presence of speech content within the first set of frames {F1-F40} and the second contextual parameter may indicate absence of speech content within the second set of frames {F41-F80}. In accordance with some embodiments, not all frames within an identified audio segment are contiguous. As an example, in a given sequence of audio frames numbered from F81 through F120 within the audio data 124, the audio controller device 100 may identify a third set of frames {F81-F90, F100-F110} as being associated with a third contextual parameter and a fourth set of frames {F91-F99, F111-F120} as being associated with a fourth contextual parameter. In this example, the third contextual parameter may indicate speech portions that are associated with a first speaker and fourth contextual parameter may indicate speech portions that are associated with a second speaker. Although four contextual parameters are described herein as an example, the audio controller device 100 may identify any number of audio segments based on any number of contextual parameters depending on whether a given combination of one or more contextual parameters uniquely defines and/or has an effect on the content of the respective audio segments in the audio data 124.

In accordance with some embodiments, the audio controller device 100 further sets an optimal playback speed rate for each of the audio segments based on the one or more contextual parameters that are identified as affecting the respective one of the audio segments. As an example, the audio controller device 100 may determine that the first audio segment defined by the first set of frames {F1-F40} includes speech content and therefore may set the optimal playback speed rate to 1×, where 'x' represents a standard playback speed rate. Similarly, the audio controller device 100 may determine that the second audio segment defined by the second set of frames {F41-F80} includes inactive speech or silence, and therefore may set the optimal playback speed to 4×, so that the listener can listen to this portion of the audio data 124 at a relatively shorter time. The audio controller device 100 may determine optimal playback speed rate for each of the audio segments based on one or more of: pre-determined mapping of different optimal playback speed rates to different contextual parameters, user preferences, and input from machine learning algorithms that determine optimal playback speed rate based on playback speed rates used by listeners with different user profiles for different combination of contextual parameters. The optimal playback speed rates for different audio segments may be different.

At block 240, the audio controller device 100 associates each of the plurality of identified audio segments to a respective one of a plurality of primary audio control interfaces 134. In accordance with some embodiments, the audio controller device 100 generates a plurality of graphical user interface components each corresponding to a respective one of the primary audio control interfaces 134 and renders the graphical user interface components on the electronic display 140. In other words, each graphical user interface component is associated to a single audio segment, and any input received at a particular graphical user interface component causes the electronic processor 116 to control a playback operation (e.g., vary the playback speed rate) only for the corresponding single audio segment to which the user interface component is associated. For example, the audio controller device 100 may generate a first graphical user interface component to control a playback operation parameter for the first audio segment defined by frames {F1-F40}; a second graphical user interface component to control the playback operation parameter for the second audio segment defined by frames {F41-F80}; a third graphical user interface component to control the playback operation parameter for the third audio segment defined by frames {F81-F90, F100-F110}; and a fourth graphical user interface component to control the playback operation for the fourth audio segment defined by frames {F91-F99, F111-F120}; and so on. In alternative embodiments, the audio controller device 100 may associate the identified audio segments to available physical audio control interfaces (for example, buttons or knob controls) so that playback operation for the audio segments can be independently controlled by separate physical audio control interfaces. Other possibilities exist as well, for example, the audio controller device may associate the identified audio segments to a combination of graphical user interface components and physical audio control interfaces based on the number of audio segments that are identified within the audio data 124.

The audio controller device 100 may also generate and render a graphical user interface component on the electronic display 140 for a secondary audio control interface 136 which is configured to scale respective playback speed rates that are set (i.e., one of optimal playback speed rate selected by the device 100 or playback speed rate previously set via user input) at each one of the primary audio control interfaces 134.

At block 250, the audio controller device 100 determines whether an input is received at one or more of the primary audio control interfaces 134. If no input is received at any of the primary audio control interfaces 134, the audio controller device 100 continues to monitor for any input at one or more of the primary audio control interfaces 134. At block 260, when an input is received at one or more of the primary audio control interfaces 134, the audio controller device 100 controls the playback operation corresponding to the audio segments for which input is received at one or more of the primary audio control interfaces 134. For example, when an input indicating the playback speed rate is received at the first graphical user interface component corresponding to the first audio segment defined by the frames {F1-F40}, the playback speed rate is varied only for a portion of the audio data 124 containing the frames {F1-F40} according to the input. The audio controller device 100 playbacks, via the speaker 160, the first audio segment according to the varied playback speed rate. In this case, the playback speed rate for the other audio segments (e.g., second, third, and fourth audio segments) remain either at the optimal playback speed rate respectively set for the corresponding audio segments or at a playback speed rate previously selected via user input. Accordingly, in this case, the audio controller device 100 playbacks, via the speaker 160, the other audio segments according to the optimal playback speed rates or the previously selected playback speed rates. Similarly, when an input indicating the playback speed rate is received at the second graphical user interface component corresponding to the second audio segment defined by the frames {F41-F80}, the playback speed rate is varied only for a portion of the audio data 124 containing the frames {F41-F80} based on the magnitude of the input. The audio controller device 100 playbacks, via the speaker 160, the second audio segment according to the varied playback speed rate. In this case, the playback speed for the other audio segments (e.g., first, third, and fourth audio segments) remain either at the optimal playback speed rate respectively set for the corresponding audio segments or at a playback speed rate previously selected via user input. Accordingly, in this case, the audio controller device 100 playbacks, via the speaker 160, the other audio segments according to the respective optimal playback speed rates or the previously selected playback speed rates.

In accordance with some embodiments, when an input is received at a particular primary audio control interface 134, the audio controller device 100 changes the playback speed rate from a previously set playback speed rate to a newly generated playback speed rate which is determined based on an input value defined by the magnitude or selection of the input. As an example, the previously set playback speed rate may correspond to either the optimal playback speed rate that is automatically set by the audio controller device 100 based on the contextual parameters affecting the corresponding audio segment or a value set by the user based on a previous input at the particular primary audio control interface 134.

In accordance with some embodiments, when no input is received at a primary audio control interface 134 during playback of the audio data 124, the audio controller device 100 playbacks the audio segment associated with the primary audio control interface 134 according to optimal playback speed rate that is determined based on the one or more contextual parameters affecting the audio segment.

FIG. 3 is a graph 300 illustrating different audio segments that are identified from an audio data 124 based on contextual parameters 126 associated with the audio data 124, in accordance with some embodiments. In the graph 300, audio pitch 310 corresponding to the audio data 124 is represented over a period of time 320 when the audio data 124 is to be played back according to a standard playback speed rate (e.g., 1×). For example, the audio data 124 for which the graph is plotted in FIG. 3 corresponds to recorded portion of conversations between two persons, Person 'A' and Person 'B'. In accordance with some embodiments, the audio controller device 100 analyzes the audio pitch 310 associated with the audio data 124 and also metadata (sensor data) received from other sources to determine a plurality of contextual parameters and identify different audio segments within the audio data 124 based on the contextual parameters. In the graph 300, the different audio segments are represented as being identified based on contextual parameters such as optimal speech 325, language 330, accent 335, speech speed 340, background noise 345, inactive speech 350, audio volume 355, and speaking behavior 360.

FIG. 4 is a graph 400 illustrating optimal playback speed rate that are determined for different audio segments (also shown in FIG. 3) based on contextual parameters associated with the audio data, in accordance with some embodiments. In the graph 400, audio pitch 410 corresponding to the audio data 124 is represented over a period of time 420 when the audio data 124 is to be played back according to the optimal playback speed rates that are automatically determined by the audio controller device 100 for different audio segments based on the respective contextual parameters. Similar to FIG. 3, the contextual parameters shown in FIG. 4 include optimal speech 425, language 430, accent 435, speech speed 440, background noise 445, inactive speech 450, audio volume 455, and speaking behavior 460. For example, the audio segment corresponding to the contextual parameter identified as 'background noise' 445 is played back at 2.2×. In contrast, the audio segment corresponding to the contextual parameter identified as 'speech speed' 440 is played back at 1.8×. Accordingly, the optimal playback speed rate identified for different audio segments may be different.

Figure 5:
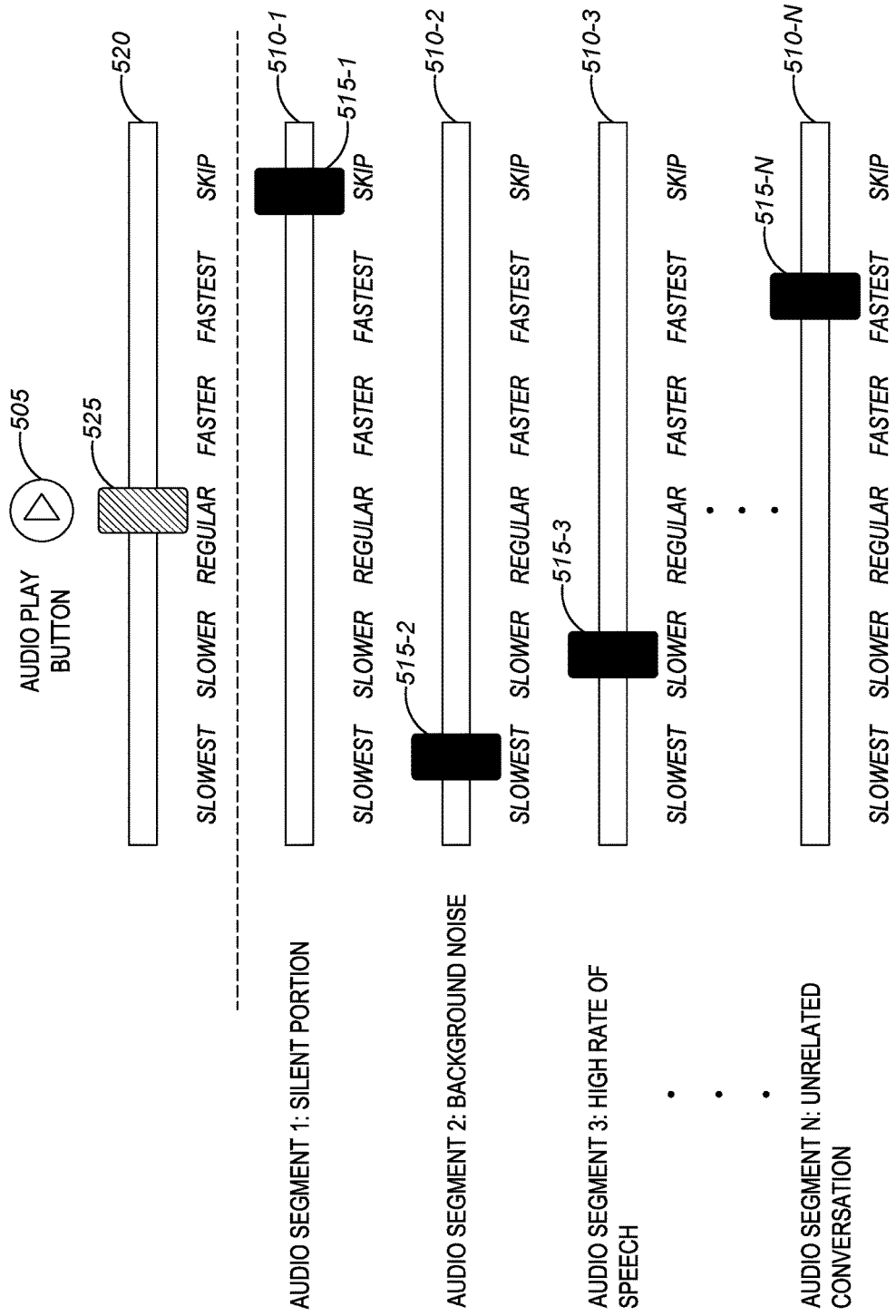
FIG. 5 illustrates a representation of different graphical user interface components that are generated for controlling playback operation of an audio data, in accordance with some embodiments.

FIG. 5 illustrates a representation of different graphical user interface components that are generated for controlling playback operation associated with an audio data 124, in accordance with some embodiments. FIG. 5 shows an audio play button interface 505 that is rendered on the electronic display 140. The audio play button interface 505 enables the user to play, pause, or stop playback of a selected audio file. For example, when the user presses the audio play button interface 504 after selecting an audio file to playback the audio, the audio controller device 100 in accordance with the embodiments, identifies different audio segments within the audio file based on contextual parameters and further automatically generates and renders a plurality of graphical user interface components, one for each primary audio control interface 134 on the electronic display 140. As shown in FIG. 5, a plurality of primary audio control graphical user interface components 510-1, 510-2 . . . 510-N is shown as generated for the corresponding 'N' audio segments, where each of the 'N' audio segments is identified based on a given contextual parameter. Each primary audio control graphical user interface component 510 also includes a selection button 515-1, 515-2 . . . 515-N, respectively. The selection button 515 allows the user to provide input indicating a playback speed rate at which a particular one of the audio segment is to be played back. In accordance with some embodiments, the selection component 515 may be used to select a playback speed rate from a range of playback speed rates that are shown along the respective primary audio control graphical user interface component 510. For example, the selection button 515 may be used to select from playback speed rates ranging between 'slowest', 'slower', 'regular', 'faster', and 'fastest' that are indicated alongside the respective primary audio control GUI component 510. Other indications may also be used, for example, the playback speed rates ranging from 0.25×, 0.5×, 1×, 2×, 3×, 8×, 16×, and the like. In some embodiments, the primary audio control GUI component 510 may allow the user to manually input a value associated with a particularly playback speed rate or it may provide the user with an input mechanism that allows the user to set the playback speed rate, for example, by increasing or decreasing the playback speed rate relative to one of: standard playback speed rate or the optimal playback speed rate or the playback speed rate previously set by the user. In some embodiments, also shown in FIG. 5, each primary audio control graphical user interface component 510 also further allows the user to control other playback operation parameters such as to 'skip' playback operation so that playback for the corresponding audio segment may be skipped in order for the next audio segment to be played back. Similarly, the graphical user interface component 510 may be used to control speaker volume level for the corresponding audio segment.

In the example shown in FIG. 5, the graphical user interface component 510-1 is associated with audio segment '1' that is identified based on contextual parameter 'silent portion'; the graphical user interface component 510-2 is associated with audio segment '2' that is identified based on contextual parameter 'background noise'; the GUI component 510-3 is associated with audio segment '3' that is identified based on contextual parameter 'high rate of speech'; the graphical user interface component 510-N is associated with audio segment 'N' that identified based on contextual parameter 'unrelated conversation'. FIG. 5 also further shows the playback speed rate selected by the user for the 'N' audio segments. For example, for audio segment '1', the user has selected 'skip' via the selection button 515-1 because it appears from the contextual parameter 'silent portion' that audio segment 1 does not include any audio data that may be of interest to the user, and therefore the user would have wanted to skip listening to the audio segment. Similarly, for audio segment 'N', the user has selected 'fastest' as the playback speed rate, via the selection button 515-N, because the contextual parameter 'unrelated conversation' may indicate that audio segment N contains conversations that are not related to the listener. The audio controller device 100 may determine that the audio segment 'N' corresponds to 'unrelated conversation' by comparing the content of the audio segment 'N' with a user profile corresponding to the listener. For example, the audio controller device 100 may determine that the user may not be interested to listen to speech content that includes information related to a portion of an incident that is not assigned to the user. For audio segments '2' and '3', the user has selected 'slower' and 'slowest' respectively because the corresponding contextual parameters 'Background Noise' and 'High Rate of Speech' both indicate that the user may have difficulty in understanding the content of the respective audio segments. In accordance with some embodiments, each primary audio control graphical user interface component 510 may be labeled to display information related to the contextual parameter associated with the corresponding audio segment. This label may allow the user to understand the contextual parameter affecting the corresponding audio segment and hence the user may be able to control playback operation for each audio segment separately and/or independently from other audio segments in accordance with the contextual parameters and user's preferences.

FIG. 5 further shows a graphical user interface component 520 corresponding to a secondary audio control interface 136. The graphical user interface component 520 also includes a selection button 525 that is rendered on the electronic display 140 to enable the user to provide input indicating a scaling factor. The scaling factor input at the graphical user interface component 520 automatically scales (e.g., multiplies by a value) the optimal playback speed rates that are set by the audio controller device 100 for each of the audio segments based on the respectively associated contextual parameters. In accordance with some embodiments, the secondary audio control interface 136 acts as a master control that automatically applies a multiplier to each of the optimal playback speed rates that are set by the audio controller device 100. In the example shown in FIG. 5, the scaling factor may be selected from the playback speed rates ranging between 'slowest', 'slower', 'regular', 'faster', and 'fastest'. This selection automatically re-computes the playback speed rates for each of the audio segments by applying a 'multiplier' corresponding to the selected playback speed rate to the optimal playback speed rate that are set for each of the audio segments.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An audio controller device, comprising:
   a memory for storing audio data;
   a plurality of primary audio control interfaces; and
   an electronic processor coupled to the primary audio control interfaces and the memory, the electronic processor configured to:
      identify a plurality of audio segments from the audio data based on a plurality of contextual parameters associated with the audio data, wherein each of the plurality of audio segments includes a set of audio frames from the audio data, wherein each set of audio frames included in a respective one of the audio segments is uniquely identified by a combination of one or more of the contextual parameters;
      associate each of the plurality of audio segments to a respective one of the primary audio control interfaces to enable each of the audio segments to be independently controlled through the respective one of the primary audio control interfaces to which the audio segment is associated; and
      control a playback operation for all the audio frames included only in the respective one of the audio segments when an input is received at one or more of the primary audio control interfaces.

2. The device of claim 1, wherein the electronic processor is configured to control the playback operation by varying a playback speed rate for all the audio frames included only in the respective one of the audio segments when the input is received at one or more of the primary audio control interfaces.

3. The audio controller device of claim 2, wherein the electronic processor is configured to:
   set an optimal playback speed rate for each of the audio segments based on the combination of one or more of the contextual parameters that uniquely identifies the audio frames included in the respective one of the audio segments; and playback, via a speaker, all the audio frames included only in at least one of the audio segments according to the corresponding optimal playback speed rate when no input is received at the primary audio control interface corresponding to the at least one of the audio segments.

4. The audio controller device of claim 3, wherein the electronic processor is configured to:
vary the optimal playback speed rate by an input value for all the audio frames included only in the at least one of the audio segments when an input corresponding to the input value is received at the primary audio control interface corresponding to the at least one of the audio segments; and
playback, via the speaker, all the audio frames included only in the at least one of the audio segments according to a playback speed rate that is varied by the input value.

5. The audio controller device of claim 2, further comprising:
a secondary audio control interface, wherein an input received at the secondary audio control interface causes the electronic processor to scale respective playback speed rates that are set at each one of the primary audio control interfaces.

6. The audio controller device of claim 1, wherein the electronic processor is configured to control the playback operation by skipping a playback operation for all the audio frames included only in the respective one of the audio segments when the input is received at one or more of the primary audio control interfaces.

7. The audio controller device of claim 1, wherein the electronic processor is configured to control the playback operation by varying a speaker volume level for all the audio frames included only in the respective one of the audio segments when the input is received at one or more of the primary audio control interfaces.

8. The audio controller device of claim 1, wherein the electronic processor is configured to generate a plurality of separate graphical user interface components each corresponding to a respective one of the primary audio control interfaces, the audio controller device further comprising:
an electronic display for rendering the plurality of separate graphical user interface components.

9. The audio controller device of claim 8, wherein each of the separate graphical user interface components provide a control to vary a playback speed rate of the respective one of the audio segments.

10. The audio controller device of claim 1, wherein the contextual parameters are selected from the group consisting of: speech portion in the audio data, volume level associated with different portions of the audio data, language associated with the audio data, tone of different portions of the audio data, length of different portions of the audio data, noise level associated with different portions of audio data, location at which the audio data is captured, temperature corresponding to the location at which the audio data is captured, video data corresponding to different portions of the audio data, user profile identifying a speaker associated with different portions of the audio data, and user profile identifying a potential listener of the audio data.

11. A method of operating an audio controller device, the method comprising:
storing, at a memory of the device, an audio data;
identifying, by an electronic processor of the device, a plurality of audio segments from the audio data based on a plurality of contextual parameters associated with the audio data, wherein each of the plurality of audio segments includes a set of audio frames from the audio data, wherein each set of audio frames included in a respective one of the audio segments is uniquely identified by a combination of one or more of the contextual parameters;
associating, by the electronic processor, each of the plurality of audio segments to a respective one of a plurality of primary audio control interfaces provided at the audio controller device to enable each of the audio segments to be independently controlled through the respective one of the primary audio control interfaces to which the audio segment is associated; and
controlling, by the electronic processor, a playback operation for all the audio frames included only in the respective one of the audio segments when an input is received at one or more of the primary audio control interfaces.

12. The method of claim 11, wherein controlling the playback operation comprises varying a playback speed rate for all the audio frames included only in the respective one of the audio segments when the input is received at one or more of the primary audio control interfaces.

13. The method of claim 12, further comprising:
setting, by the electronic processor, an optimal playback speed rate for each of the audio segments based on the combination of one or more of the contextual parameters that uniquely identifies the audio frames included in the respective one of the audio segments; and
causing a speaker to playback all the audio frames included only in at least one of the audio segments according to the corresponding optimal playback speed rate when no input is received at the primary audio control interface corresponding to the at least one of the audio segments.

14. The method of claim 13, further comprising:
varying, by the electronic processor, the optimal playback speed rate by an input value for all the audio frames included only in the at least one of the audio segments when an input corresponding to the input value is received at the primary audio control interface corresponding to the at least one of the audio segments; and
causing the speaker to playback all the audio frames included only in the at least one of the audio segments according to a playback speed rate that is varied by the input value.

15. The method of claim 12, further comprising:
generating, by the electronic processor, a plurality of separate graphical user interface components each corresponding to a respective one of the primary audio control interfaces;
rendering, via an electronic display, the plurality of separate graphical user interface components; and
varying, by the electronic processor, the playback speed rate of the respective one of the audio segments based on an input received at one or more of the separate graphical user interface components.

16. The method of claim 11, wherein controlling the playback operation comprises one of:
skipping a playback operation for all the audio frames included only in the respective one of the audio segments when the input is received at one or more of the primary audio control interfaces; and
varying a speaker volume level for all the audio frames included only in the respective one of the audio segments when the input is received at one or more of the primary audio control interfaces.

17. The method of claim 11, further comprising:
receiving sensor data from one or more sensor devices that are communicatively coupled to an audio capturing device at which the audio data is captured;
determining at least one of the plurality of contextual parameters associated with the audio data based on the sensor data; and
identifying one of the audio segments including a respective set of audio frames from the audio data based on the at least one of the plurality of contextual parameters, wherein the respective set of audio frames included in the identified one of the audio segments is uniquely identified by the at least one of the plurality of contextual parameters.

18. The method of claim 11, further comprising:
receiving an image data corresponding to the audio data;
processing the image data to determine at least one of the plurality of contextual parameters associated with the audio data; and
identifying one of the audio segments including a respective set of audio frames from the audio data based on the at least one of the plurality of contextual parameters, wherein the respective set of audio frames included in the identified one of the audio segments is identified by the at least one of the plurality of contextual parameters.

19. The method of claim 18, wherein the at least one of the plurality of contextual parameters corresponds to an identity of a speaker associated with a speech content in the respective set of audio frames included in the identified one of the audio segments, and further wherein the identity of the speaker is determined from processing the image data.

20. An audio controller device, comprising:
a memory for storing audio data;
an electronic display; and
an electronic processor coupled to the memory and the electronic display, the electronic processor configured to:
identify a plurality of audio segments from the audio data based on a plurality of contextual parameters associated with the audio data, wherein each of the plurality of audio segments includes a set of audio frames from the audio data, wherein each set of audio frames included in a respective one of the audio segments is uniquely identified by a combination of one or more of the contextual parameters;
generate a plurality of separate graphical user interface components;
associate each of the audio segments to a respective one of the separate graphical user interface components to enable each of the audio segments to be independently controlled through the respective one of the separate graphical user interface components to which the audio segment is associated;
render, via the electronic display, the plurality of separate graphical user interface components; and
adjust a playback operation parameter for all the audio frames included only in the respective one of the audio segments according to an input received at one or more of the plurality of separate graphical user interface components.

* * * * *